(12) United States Patent
Lee

(10) Patent No.: US 6,830,342 B2
(45) Date of Patent: Dec. 14, 2004

(54) OPTICAL SYSTEM AND DISPLAY DEVICE USING THE SAME

(75) Inventor: Seung Gyu Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/419,092

(22) Filed: Apr. 21, 2003

(65) Prior Publication Data

US 2003/0197837 A1 Oct. 23, 2003

(30) Foreign Application Priority Data

Apr. 23, 2002 (KR) .................................. 10-2002-0022263

(51) Int. Cl.⁷ .................... G03B 21/14; G03B 21/28; G02F 1/00; F21V 7/04; G02B 6/00
(52) U.S. Cl. ............................ 353/84; 353/37; 353/98; 348/743; 348/759; 348/790; 349/25; 349/106; 359/891; 362/551
(58) Field of Search ........................... 353/84, 81, 99, 353/98, 31, 33, 34, 37, 102, 112, 127; 348/742, 743, 771, 759, 790; 359/712, 618, 891, 892, 885, 887; 349/5, 7, 18, 25, 106; 362/551; 385/11, 34, 50, 133, 146, 901, 131, 130, 123

(56) References Cited

U.S. PATENT DOCUMENTS 6,356,700 B1 * 3/2002 Strobl .......................... 385/147
6,439,726 B1 * 8/2002 Piehler ......................... 353/98
6,587,269 B2 * 7/2003 Li ............................... 359/497
2002/0024637 A1 * 2/2002 Davis et al. .................. 353/31

* cited by examiner

Primary Examiner—Judy Nguyen
Assistant Examiner—Rochelle Blackman
(74) Attorney, Agent, or Firm—Fleshner & Kim, LLP (57) ABSTRACT

There is provided a display device in which an optical efficiency is improved using a color drum. The display device includes a road lens for totally reflecting an incident light and changing a path of the light. The display device further includes a color drum having a plurality of cell filters arranged cylindrically to face the path of the light outputted from the road lens. Here, the cell filters are in a linear shape. Since the light reflected by the color drum is not lost to the outside, the light efficiency can be enhanced. According to the invention, the linear scroll is possible due to the cell filters that are in the linear shape, so that signal process algorithm can be simplified.

24 Claims, 11 Drawing Sheets

OPTICAL SYSTEM AND DISPLAY DEVICE USING THE SAME

BACKGROUND OF THE INVENTION

1. Field of the Invention

The present invention relates to a device for displaying a large-sized image, and more particularly, to a display device in which the optical efficiency is enhanced by using a color drum.

2. Description of the Related Art

Recently, a flat panel display that has thin and large-sized screen attainment characteristics attracts public attention, and is anticipated to replace the conventional cathode ray tube (CRT) that has a limitation in the screen size and a large volume. As such a flat panel display, there are a liquid crystal display (LCD), a plasma display panel (PDP), a projector and the like. Among these flat panel displays, the projector that magnifies a small-sized image made by an LCD and projects the magnified image to a large-sized screen through a projection lens stands in the spotlight as a new large-sized screen display.

The projector includes a lamp system for generating light, an optical system for converging the generated light, an image display device for displaying the converged light as colors according to an inputted electric signal, and a projection system for magnifying and projecting the displayed colors. Here, the image display devices are classified into a transmission type image display device for transmitting an incident light according to an inputted electric signal and a reflection type image display device for reflecting the incident light according to the inputted electric signal. The LCD having an advantage of the slimness is mainly used as the image display device.

Recently, as a small-sized image display device is developed, various kinds of projectors are being commercialized. The projectors are generally classified into single panel type using one sheet of image display device, double panel type using two sheets of image display devices and triple panel type using three sheets of image display devices. The single panel type projector that uses one sheet of image display device to display images is currently widely used in aspects of cost and structure.

The single panel type projector can use any one of three ways to express the white color: a first way in which R, G and B color filters are attached to the image display device to express the white color, a second way in which micro lenses are attached to the image display device to split R, G and B color lights in different directions and to express the white color, and a third way in which color wheels are utilized to transmit R, G and B color lights selectively one after another in time order.

Figure 1:
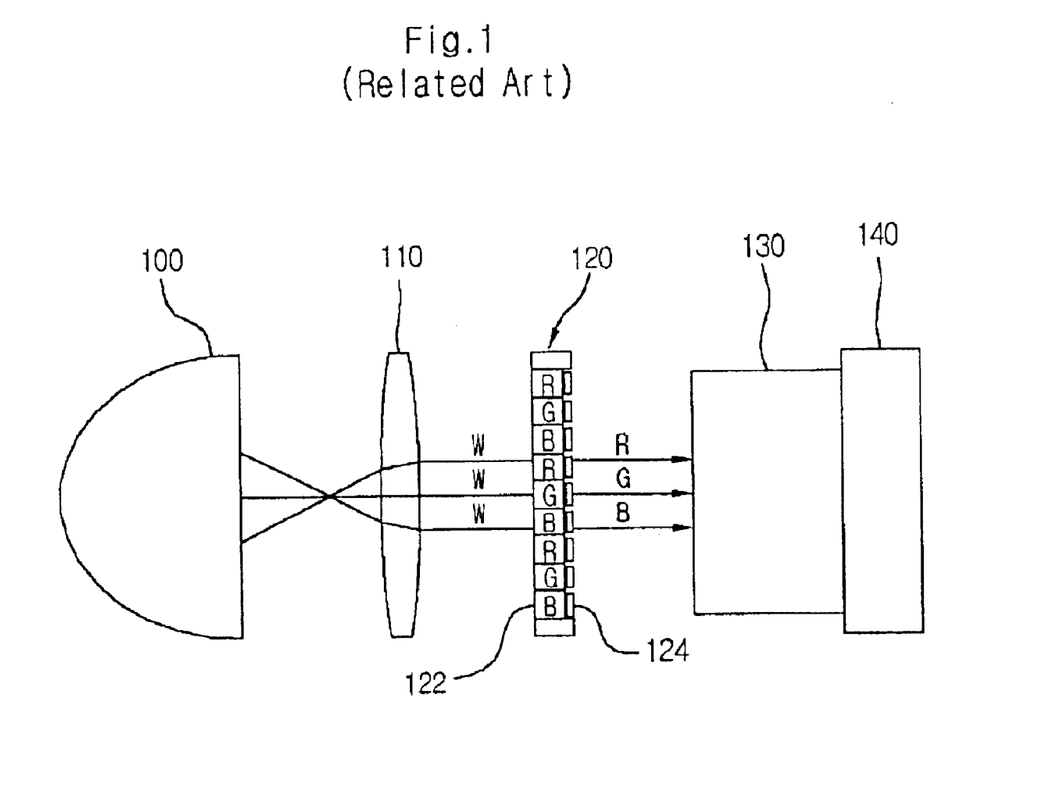
FIG. 1 illustrates a conventional projector in which color filters are attached to an image display device.
Figure 2:
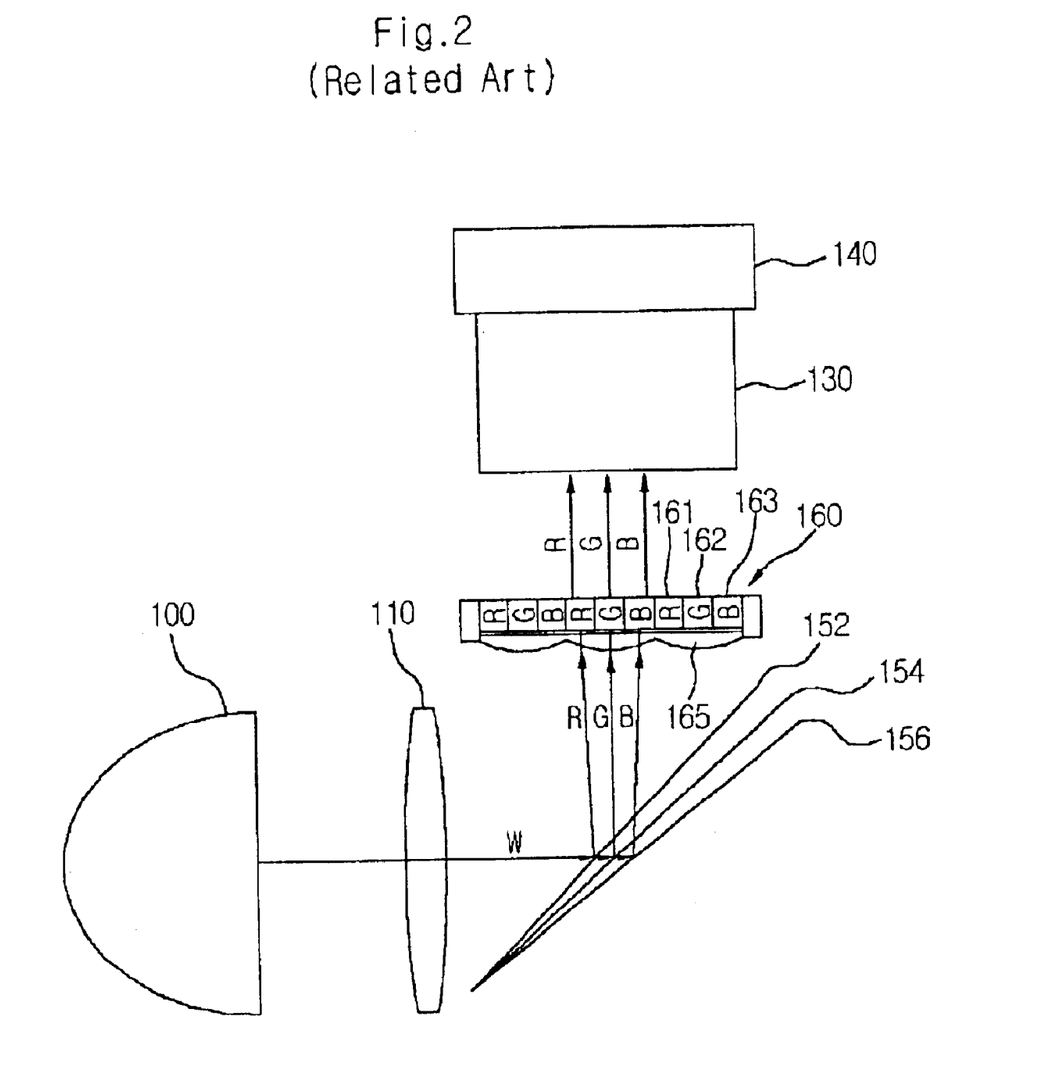
FIG. 2 illustrates a conventional projector in which a micro lens is attached to an image display device.

FIG. 1 illustrates a conventional projector in which color filters are attached to the image display device and FIG. 2 illustrates a conventional projector in which a micro lens is attached to the image display device.

Referring to FIG. 1, in an image display device 120, R, G and B pixels 122 are linearly arranged and a filter 124 is attached to each pixel 122. Light generated by a lamp system 100 is converged by an optical system 110 and incident into the image display device 120. Here, the image display device 120 expresses the incident light as colors according to inputted electric signals. Accordingly, the converged light is expressed as colors depending on the electric signal inputted to each pixel 122 of the image display device 120, and transmits the filter 124 or is reflected by the filters 124. The transmitted colors are magnified and outputted onto a screen 140 by a projection lens 130.

In such a way, however, since three pixels (R, G, B) express one white light, the total number of pixels on the image display device 120 express the white color of which the resolution is reduced to one third (⅓). Like this, since so large area is required to express one white color, the resolution is lowered. In addition, since the filters 124 attached to the image display device 120 do not have good transmission characteristics, they lower the optical efficiency.

As an alternative proposal, referring to FIG. 2, micro lenses 165 each of which corresponds to three pixels 161, 162 and 163 of R, G and B are arranged on an image display device 160. Separate R, G and B reflection mirrors 152, 154 and 156 are provided between the optical system 110 and the image display device 160 in order to split the light and apply the split lights to the pixels 161, 162 and 163 at specific angles respectively. Accordingly, the light generated by the lamp system 100 passes the optical system 110, is split into color lights by the reflection mirrors 152, 154 and 156, and is then incident into the image display device 160 at different angles depending on the slopes of the reflection mirrors 152, 154 and 156. The image display device 160 receives the lights inputted from the reflection mirrors 152, 154 and 156 through the micro lenses 165 and sends them to corresponding pixels 161, 162 and 163 to express colors according to the inputted electric signal.

However, even in such a way, since three pixels express one white color like the way in which filters are attached to the image display device (shown in FIG. 1), the resolution is lowered.

Figure 3:
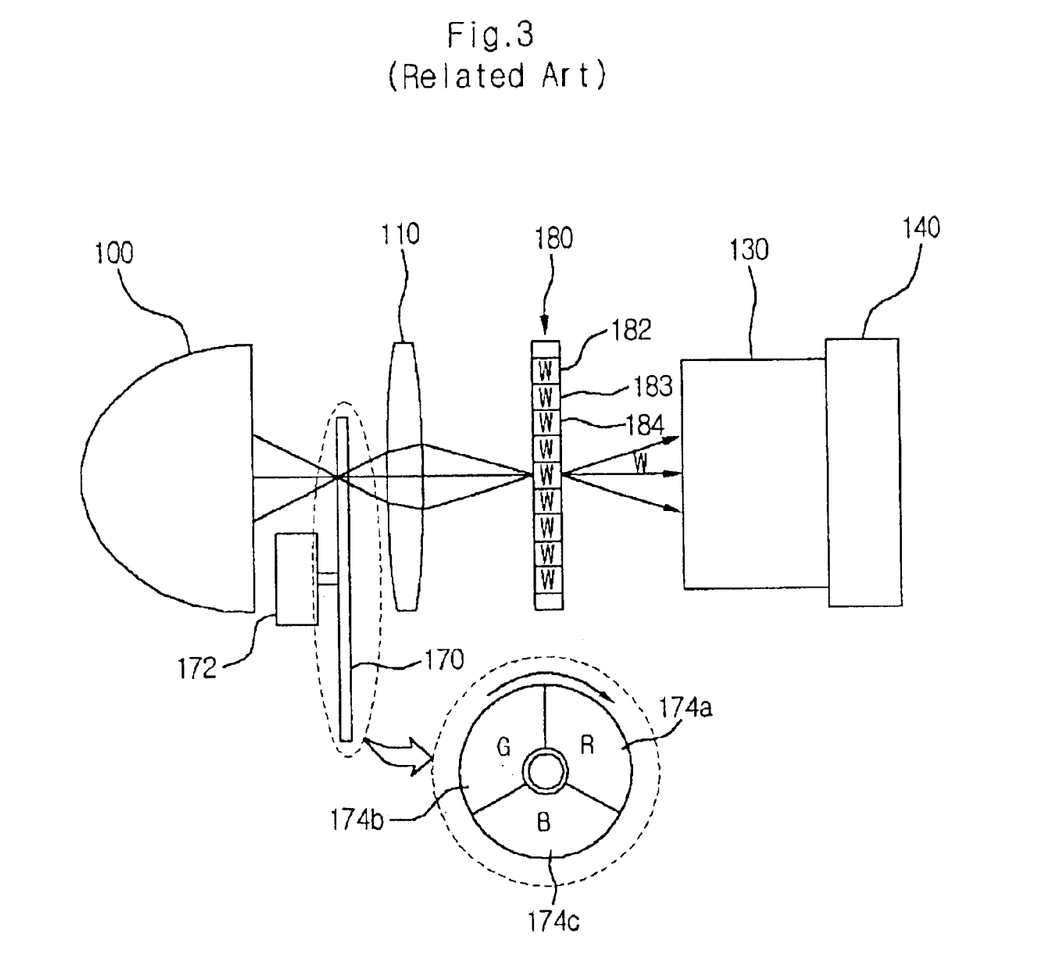
FIG. 3 illustrates a conventional projector using a color wheel.

To solve the lowering problem in the resolution appearing in the ways of FIGS. 1 and 2, a way shown in FIG. 3 has been suggested.

FIG. 3 illustrates a conventional projector using a color wheel.

Referring to FIG. 3, an image display device 180 includes white pixels 182, 183 and 184 arranged to express one white color by one pixel and a color wheel 170 between a lamp system 100 and an optical system 110. The color wheel 170 has R, G and B transmission filters 174a, 174b and 174c arranged on predetermined areas of a rotation disk.

As the light generated by the lamp system 100 is incident into the color wheel 170, the color wheel 170 is rotated by a motor 172 to split the incident light into color lights sequentially and transmit the split color lights to the optical system 110. Then, the optical system 110 converges the split color lights to one white pixel of the image display device 180 to express a white color.

Since the above method can express one white color by one white pixel, the resolution is enhanced by three times compared with the related arts shown in FIGS. 1 and 2 but the brightness is contrary decreased to one third (⅓). This is because the color wheel 170 transmits only the corresponding lights of the respective transmission filter 174a, 174b and 174c and the remaining light is not transmitted but lost to decrease the amount of light so. Accordingly, the light efficiency is decreased.

According to the way described above, the resolution is good but the brightness is bad. To this end, there is being developed a technology which is based on the way shown in FIG. 3 and in which the light reflected from the color wheel and lost is reused to enhance the light efficiency.

Figure 4:
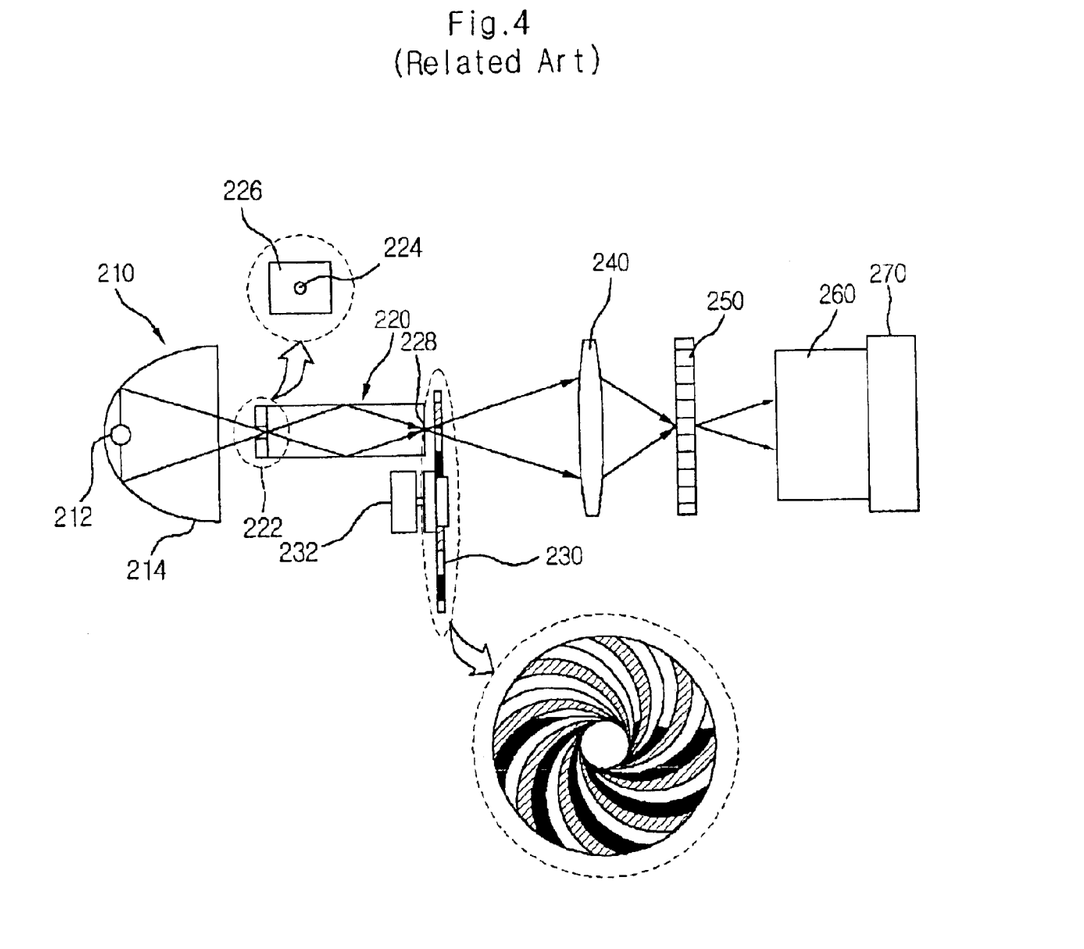
FIG. 4 illustrates a conventional projector which includes a road lens.

FIG. 4 illustrates a conventional projector provided with a road lens.

Referring to FIG. 4, a conventional projector includes a lamp system 210 for generating light, a road lens 220 shaped in a rectangular, for receiving the light generated from the lamp system 210, totally reflecting and outputting the generated light, and totally reflecting and outputting the re-inputted light, a color wheel 230 for selectively transmitting the light outputted from the road lens 220, a converging lens 240 for converging the transmitted light from the color wheel 230, an image display device 250 for expressing the converged light in colors, and a projection lens for magnifying and projecting the colors expressed by the projection lens 260 onto a screen 270.

The lamp system 210 includes a light source 212 for generating the light and an elliptic reflecting mirror 214 for controlling the generated light to be inputted to the road lens 220. Accordingly, all the light generated by the converging lens 210 is incident into the road lens 220.

The road lens 220 includes an inside made of optical glass or optical plastic. Alternatively, the inside of the road lens 220 may be a vacant space. Also, the outer wall of the road lens 220 is coated with a total reflection material. In addition, an opening 224 is formed in an input surface 222 so that the light generated by the lamp 210 can be incident into the inside of the road lens 220. The remaining region 226 except for the opening 224 is coated with a reflection material. Like this, it is desirable that the region 26 is coated with a reflection material such that the light reflected by the color wheel 230 and inputted into the road lens 220 is reflected again and outputted onto the color wheel 230. Accordingly, the road lens 220 receives the light generated by the lamp system 210 through the opening 224, totally reflects it therein and outputs it to the color wheel 230 through an output surface 228.

Although the light generated by the lamp system 210 has a low uniformity in brightness, it is outputted uniformly through the output surface 228 by the total reflection in the inside of the road lens 220. Here, the brightness uniformity is changed depending on the length of the road lens 220 and a kind of the medium.

The light outputted from the road lens 220 passes the color wheel 230 or is reflected by the color wheel 230. At this time, the light reflected by the color wheel 230 is again incident into the road lens 220, is totally reflected inside the road lens 220 and is again outputted to the color wheel 230. Here, the light outputted to the color wheel 230 has a different light path than the light outputted from the road lens 220. This is because the angle of the light reflected by the color wheel 230 and the position of the light reflected totally in the road lens 220 are different from those of the first outputted light. For example, if the first outputted light is inputted to the color wheel 230 via the center of the output surface 228 of the road lens 220, the light reflected by the color wheel 230 can be again inputted to the position other than the center of the output surface 228 of the road lens 220 according to the reflection angle. Also, since the re-inputted lights are reflected totally at different locations inside the road lens 220, the final position of the light outputted to the output surface 228 of the road lens 220 becomes different from the position of the light first outputted to the color wheel 230. Similarly, since the first light outputted to the color wheel 230 is different from the final light outputted to the color wheel 230, each color light can be transmitted.

The color wheel 230 is arranged to face the output surface 228 of the road lens 220 at the same area. The R, G and B transmission filters are formed in a spiral configuration. By forming the transmission filters in a spiral configuration, R, G and B color lights can be outputted through the transmission filters uniformly.

Thus, when the color wheel 230 is comprised of spiral filters, the color lights outputted through the color wheel 230 have curved boundary surfaces 234 and 236.

Figure 5:
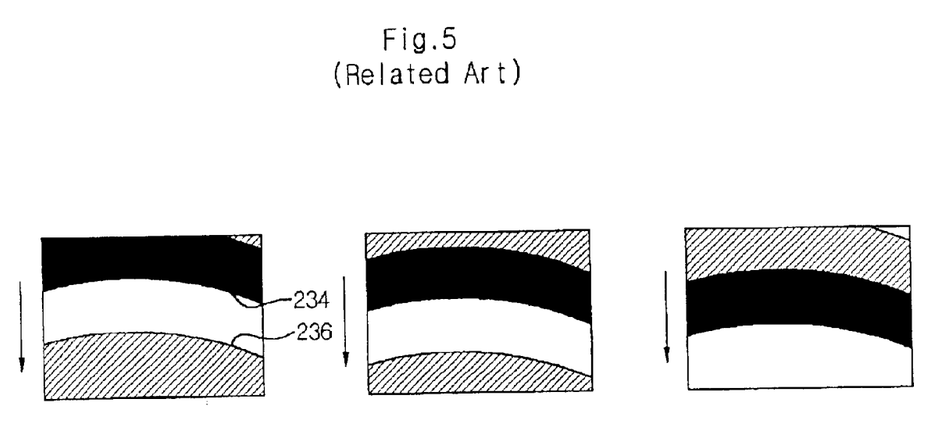
FIG. 5 illustrates a scroll according to a rotation of the color wheel of the projector shown in FIG. 4.

As shown in FIG. 5, when the color wheel 230 is rotated by a motor 232, R, G and B transmission filters move sequentially to pass the corresponding color lights selectively. After that, if the passed color lights are incident into the image display device 250 through the converging lens 240, color lights having the curved boundary surfaces 234 and 236 appear.

To this end, there is required an algorithm for converting the color lights having the curved boundary surfaces 234 and 236 to a linear type of color lights. However, the algorithm for converting the color lights having the curved boundary surfaces 234 and 236 to a linear type of color lights is very complex, which is problematic.

In the meanwhile, to convert the color lights having the curved boundary surfaces 234 and 236 to a linear type of color lights, it is desirable that the color wheel is made as great as possible. However, the use of the great color wheel causes a problem that the volume of the color wheel increases. Of course, even if the color wheel is made great, the boundary surfaces 234 and 236 are not perfectly converted to a linear arrangement.

Figure 6:
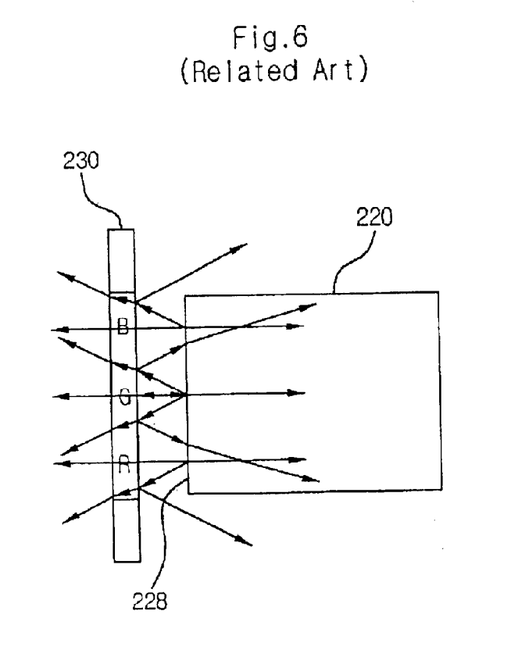
FIG. 6 illustrates that light is transmitted through and is reflected by the color wheel of the projector shown in FIG. 4.

Also, as shown in FIG. 6, the flat color wheel 230 of the conventional projector faces the output surface 228 of the road lens 220. To this end, in case the lights outputted through edges of the road lens 220 are reflected by the color wheel 230, the reflected lights are not re-inputted to the road lens but are lost outside the road lens 220. As a result, the loss of the light outputted through edges of the road lens reduces the whole light brightness.

SUMMARY OF THE INVENTION

Accordingly, the present invention is directed to an optical system and display device using the same that substantially obviates one or more problems due to limitations and disadvantages of the related art.

An object of the present invention is to provide a display device in which a cylindrical color drum is used to reduce light loss occurring between a road lens and the color drum as great as possible and thus enhance light efficiency.

Another object of the present invention is to provide a display device in which a rectangular transmission filter is provided on a cylindrical color drum to output a linear boundary surface and thus simplify the signal processing of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical system. The optical system includes: a road lens for totally reflecting light inputted from an outside, changing a path of the light and outputting the light; a cylindrical color drum having a plurality of cell filters arranged orderly along a circumference thereof to face the path of the light so that the light outputted from the road lens is transmitted selectively; and a converging lens for converging the light transmitted through the color drum.

According to the optical system, the road lens includes: an input surface having an opening for transmitting the light inputted form the outside and a reflection region coated with a reflection material; side portions for totally reflecting the light inputted though the input surface; and an output surface for outputting the total reflected light from one of the side portions. Here, the road lens further includes a reflecting surface slanted by a predetermined angle from the output surface to change the path of the light inputted though the input surface. Also, the output surface includes an opening sized to at least include the plurality of cell filters of the color drum.

The plurality of cell filters of the color drum have surfaces arranged to face the output surface in the form of a curved surface. Alternatively, the plurality of cell filters are arranged in a linear type.

According to the optical system, the road lens includes: a side portion; an input surface formed at a predetermined region of the side portion, the input surface having an opening through which the light inputted from the outside is transmitted and a reflection region, the side portion totally reflecting the light inputted though the input surface; and an output surface for outputting the total reflected light. The road lens further includes a reflecting surface slanted by a predetermined angle from the output surface to change the path of the light inputted through the input surface.

In another aspect of the present invention, there is provided a display device of magnifying and projecting a small-sized image to display a large-sized image, the device includes: a lamp system for generating light and converging the light; an optical system including a road lens for uniformly outputting the light converged by the lamp system, a color drum having a plurality of cell filters arranged orderly along a circumference thereof to face the path of the light outputted from the road lens, and a converging lens for converging the light transmitted through the color drum; an image display device for expressing the light converged by the optical system in colors according to an applied electric signal; and a projecting system for magnifying and projecting the colors expressed by the image display device.

According to the display device, the road lens includes: an input surface to which the light generated by the lamp system is inputted; a side portion for totally reflecting the light inputted through the input surface; an output surface for projecting the light reflected totally by the side portion to the color drum; and a reflecting surface slanted by a predetermined angle from the output surface, for changing a path of the light inputted from the lamp system.

Also, the road lens includes: an input surface to which the light generated by the lamp system is inputted; a reflecting surface slanted by a predetermined angle from the input surface, for changing the path of the light inputted from the lamp system; a side portion for totally reflecting the light the path of which is changed by the reflecting surface, the input surface being formed on a predetermined region of the side portion; and an output surface for outputting the light reflected totally by the side portion to the color drum.

In another aspect of the present invention, there is provided a display device of magnifying and projecting a small-sized image to display a large-sized image. The device includes: a lamp system for generating light and converging the light; a road lens for uniformly and totally reflecting the light converged by the lamp system; a color drum having a plurality of cell filters arranged orderly along a circumference thereof to face the path of the light outputted from the road lens; a converging lens for converging the light transmitted through the color drum; an image display device for expressing the light converged from the optical system in colors according to an electric signal; and a projecting system for magnifying and projecting the colors expressed by the image display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 7:
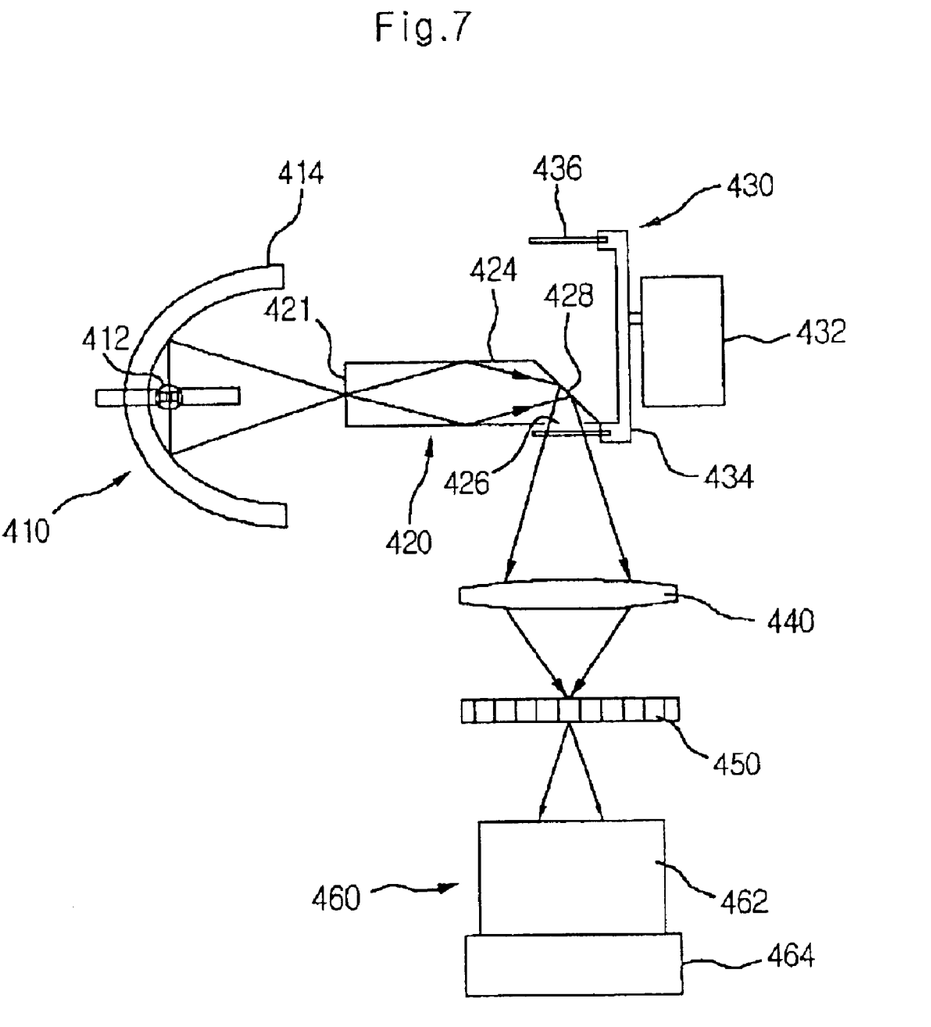
FIG. 7 is a schematic view of a projector using a color drum according to a preferred embodiment of the present invention.

FIG. 7 is a schematic view of a projector that includes a color drum according to a preferred embodiment of the present invention.

Referring to FIG. 7, the projector includes a lamp system 410 for generating light and converging the generated light around a focus, a road lens 420 for totally reflecting the light inputted from the lamp system 410, changing a path of the light and outputting the lights, a scroll unit 430 having cell filters arranged orderly in a cylindrical construction and facing the path of the light so as to transmit the light outputted from the road lens 420 selectively, a converging lens 440 for converging the light transmitted through the scroll unit 430, an image display device 450 for expressing colors by using the light of the converging lens 440 according to an applied electric signal, and a projecting system 460 for magnifying and projecting the colors expressed by the image display device 450. Here, the scroll unit 430 is preferably provided with a color drum 436 that is rotatable by a motor 432.

The lamp system 410 includes a light source 412 for generating the light and an elliptic reflecting mirror 414 for controlling the generated light to be inputted to the road lens 420. In other words, the elliptic reflecting mirror 414 has a geometrical structure such that all the light generated by and inputted from the light source 412 is reflected and focused in the vicinity of an input surface of the road lens 420.

Figure 9:
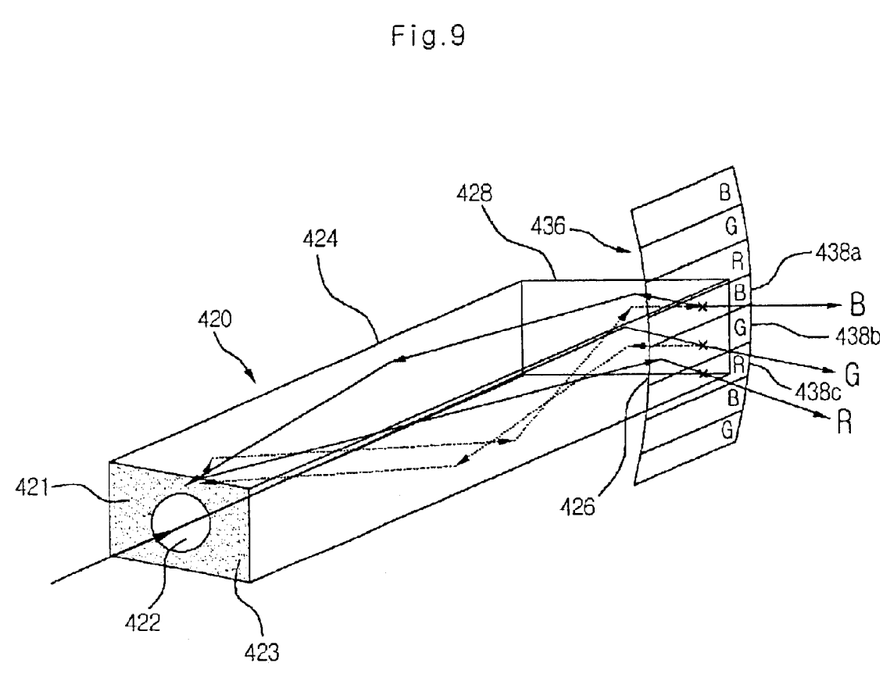
FIG. 9 illustrates that light travels between the road lens and the color drum in the projector shown in FIG. 7.

The road lens 420 is shaped in a rectangular, and includes an input surface 421, a side portion 424, a reflecting surface 428 and an output surface 426. The input surface 421, as shown in FIG. 9, consists of an opening 422 through which light generated from the lamp system 410 is passed, and a reflection region 423 for reflecting the light, which is reflected by the scroll unit 430 and returns to the inside of the road lens 420, and outputting the reflected light to the scroll unit 430. The reflection region 423 is a region other than the opening 422 and is coated with a reflection material.

The side portion 424 includes the output surface 426 formed at a predetermined region thereof. The output surface 426 outputs the light inputted to the inside of the road lens 420 to the scroll unit 430. Here, it is desirable that the output surface 426 includes an opening. Usually, the opening of the output surface 426 is greater than the opening 422 of the input surface 421. This is because the opening 422 of the input surface 421 is required to pass only the light converged by the lamp system 410 but the opening 422 of the output surface 426 is required to output to the outside all the lights which is reflected by the reflecting surface 428 to have a wide reflection angle distribution. In other words, it is desirable that the opening of the output surface 426 is as big as a size including three cell filters 438a,438b and 438c of the color drum 436 at least. Or, it is desirable that the opening of the output surface 426 is as big as a size including the number of the cell filters of the used colors R, G and B.

The road lens 420 further includes a reflecting surface 428 between the input surface 421 and the output surface 426 to change a light path. It is desired that the reflecting surface 428 is slanted from the output surface 426 by a predetermined angle. Accordingly, the light inputted through the input surface 421 is reflected by the reflecting surface 428 with a predetermined angle and outputted to the scroll unit 430 through the output surface 428. Or the reflection surface 428 may be coated with total refection material or have a piece of total reflection mirror. The light inputted through the input surface 421 is reflected totally by the side portion 424 and outputted through the output surface 426 via the reflection surface 428.

The road lens 420 is provided with the reflecting surface 428 for changing light path between the input surface 421 and the output surface 426. The reflecting surface 428 is preferably inclined to have a predetermined angle with respect to the output surface 426. Accordingly, the light that is inputted through the input surface 421 is reflected at a predetermined angle and is then outputted to the scroll unit 430 through the output surface 426. Or, the reflecting surface 428 may be configured to be coated with a total reflection material and have an attached piece of a total reflection mirror. The light inputted through the input surface 421 may be totally reflected at the side portion and be outputted through the output surface 426 via the reflecting surface 428.

In the meanwhile, some of the light outputted through the output surface 426 is transmitted by the scroll unit 430 and others of the light are reflected and inputted into the inside of the road lens 420 through the output surface 426. At this time, the light inputted through the output surface 426 is reflected by the reflecting surface 428, totally reflected by the side portion 424, reflected at the reflecting area 423 of the input surface 421, reflected by the reflecting surface 428 and outputted to the scroll unit 430. Thus, the light reflected by the scroll unit 430 is totally reflected by the road lens 420 and is transmitted through the scroll unit 430, which means that the reuse of the light becomes possible and thus the light efficiency is enhanced.

Figure 8:
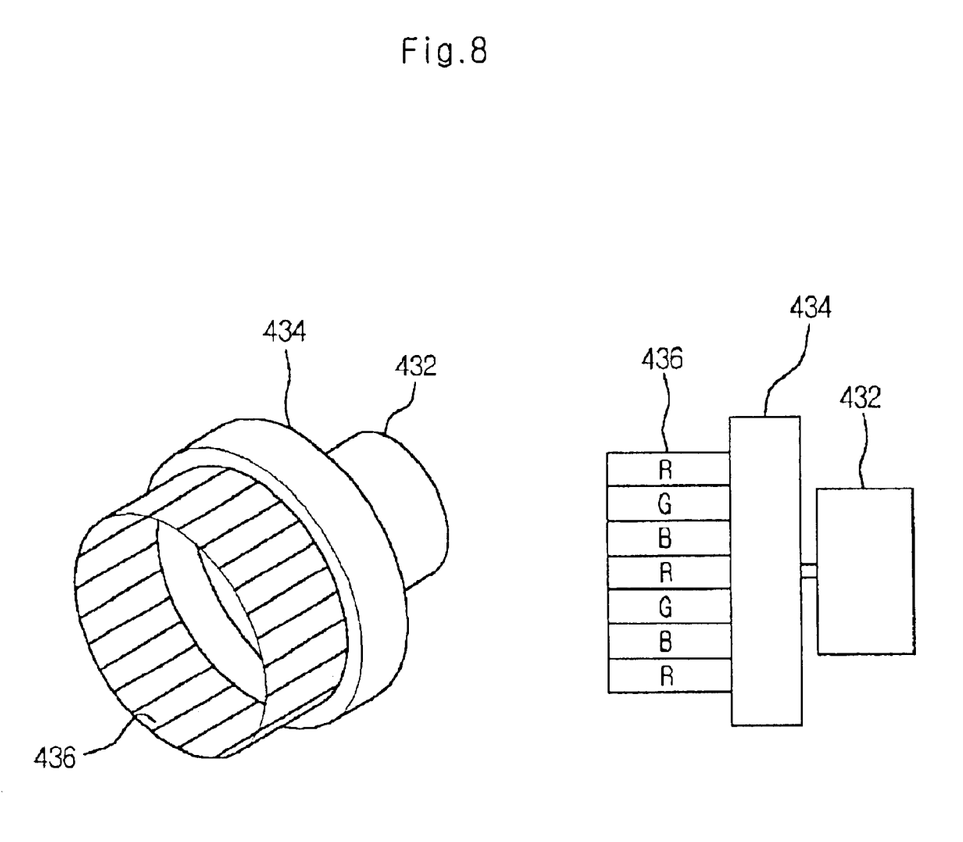
FIG. 8 is a schematic view of the color drum of the projector shown in FIG. 7.

As shown in FIG. 8, the scroll unit 430 includes a motor 432 for generating a rotational force, a color drum 436 rotating by the rotational force of the motor 432, and a coupler 434 which is an intermediate to connect the color drum 436 to the motor 432. The color drum 436 is cylindrical to surround the side portion 424 of the road lens 420. As shown in FIG. 9, the color drum 436 may have R, G and B cell filters 438a,438b and 438c arranged in a cylindrical shape or in a combination of a plurality of color cell filters. It is desirable that the cell filters 438a,438b and 438c are arranged in a linear shape. At this time, it is desirable that the surfaces of the R, G and B cell filters 438a, 438b and 438c face the output surface 426 of the road lens 420.

Accordingly, the light outputted through the output surface 426 of the road lens 420 is inputted to one of the R, G and B cell filters 438a, 438b and 438c. At this time, when the transmission condition is satisfied, the light is transmitted and inputted to the converging lens 440. When the transmission condition is not satisfied, the light is reflected and returns to the inside of the road lens 420 through the output surface 426. The returning light is reused by the road lens 420 and is outputted to the color drum 436. For example, if the light outputted from the road lens 420 is inputted to the R cell filter 438c, the R color light is transmitted but the other color lights are not transmitted but reflected and inputted to the road lens 420. Continuously, if the light that is reflected totally by the road- lens 420 and outputted again is inputted to the G cell filter 438b, the G color light is transmitted but the other color lights are reflected and inputted to the road lens 420 again. Through such a procedure, the corresponding color light can continue to be transmitted through the corresponding cell filter.

Figure 10:
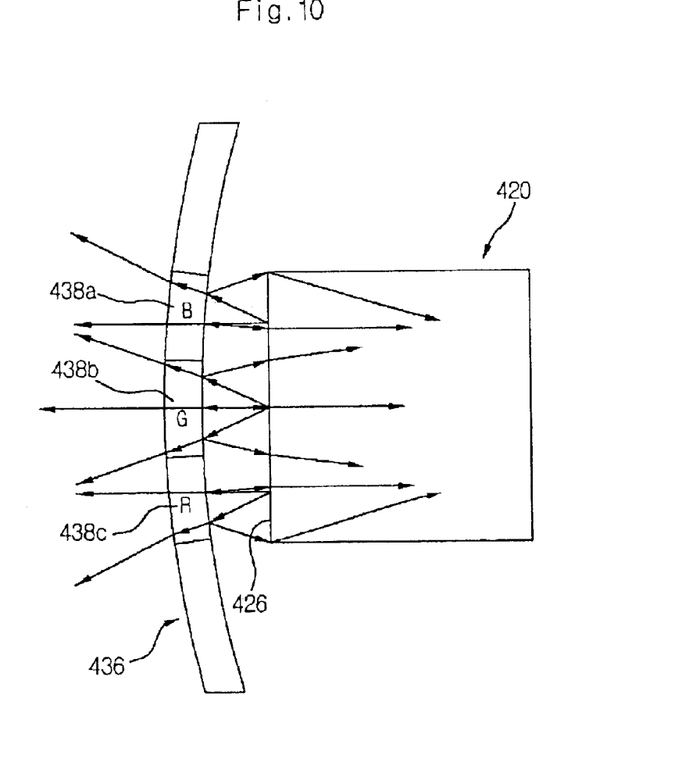
FIG. 10 illustrates that light is transmitted through and reflected by the color drum of the projector shown in FIG. 7.

In the related art, the color wheel is formed to be flat as shown in FIG. 6. Therefore, if the light outputted to the color wheel is reflected, some of the light is not inputted to the road lens and lost to outside. However, if the light outputted to the color drum 436 does not satisfy the transmission condition and is reflected, the cell filters 438a, 438b and 438c of the color drum 436 form a curved surface with respect to the output surface 426 even though the light outputted from the road lens 420 as shown in FIG. 10 is reflected by the color drum 436. So, the reflection angle of the color drum 436 becomes smaller and the light that is used to be lost to outside can be again inputted to the road lens 420. Accordingly, the amount of the lost light is reduced compared with that of the related art and the light efficiency is enhanced to implement an image having a uniform brightness.

Figure 11:
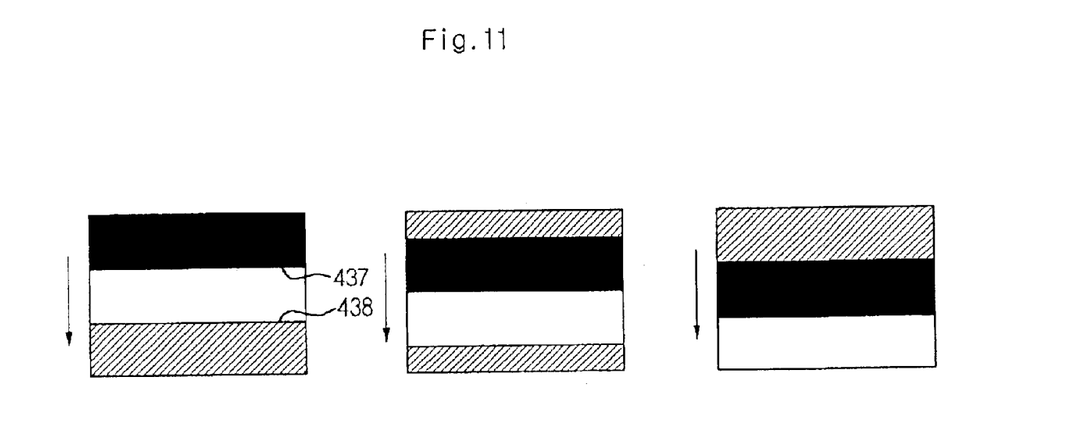
FIG. 11 illustrates a scroll according to a rotation of the color drum of the projector shown in FIG. 7.

FIG. 10 illustrates a scroll according to the rotation of the color drum of the projector. As shown in FIG. 10, while the color drum 436 is rotated, the corresponding color lights are transmitted through the cell filters 438a, 438b and 438c of the color drum 436. Here, since the cell filters 438a, 438b and 438c arranged on the color drum 436 are arranged in a linear shape as shown in FIG. 8, the boundary surfaces 437 and 438 between the color lights transmitted through the color filters 438a, 438b and 438c are all in a linear shape as shown in FIG. 11. The use of these linear type color lights enables the image display device 450 to use the linear scroll illumination, so that the signal process of the image display device 450 can be simplified.

Figure 12:
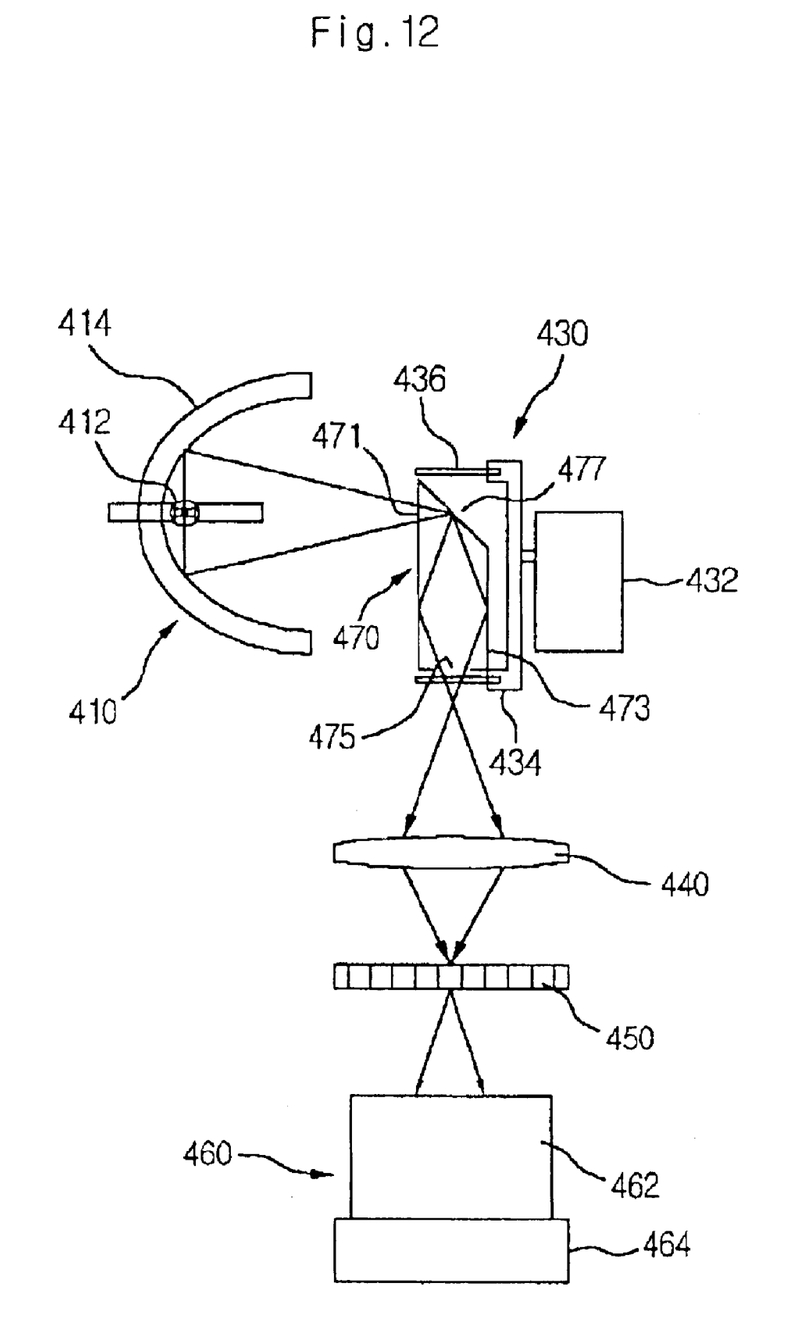
FIG. 12 is a schematic view of a projector using a color drum according to another preferred embodiment of the present invention.

FIG. 12 is a schematic view of a projector that includes a color drum according to another preferred embodiment of the present invention.

Referring to FIG. 12, a projector according to another preferred embodiment of the present invention includes a reflecting surface 477 slanted by a certain angle from an input surface 471 of a road lens 470 and changes the path of the light inputted to the input surface 471. By constructing the road lens 470 as above, the road lens 470 can be completely inserted into the color drum 436, so that the size of the projector can be reduced.

Here, the input surface 471 of the road lens 470 is formed at a predetermined region of a side portion 473. Like that shown in FIG. 7, an opening is formed at the center of the road lens 470, and a region, i.e., reflection region other than the opening, is coated with a reflection material. An output surface 475 is formed on the light path formed between the reflecting surface 477 and the color drum 436. The output surface 475 consists of the opening to output the light reflected by the reflecting surface 477.

Figure 13:
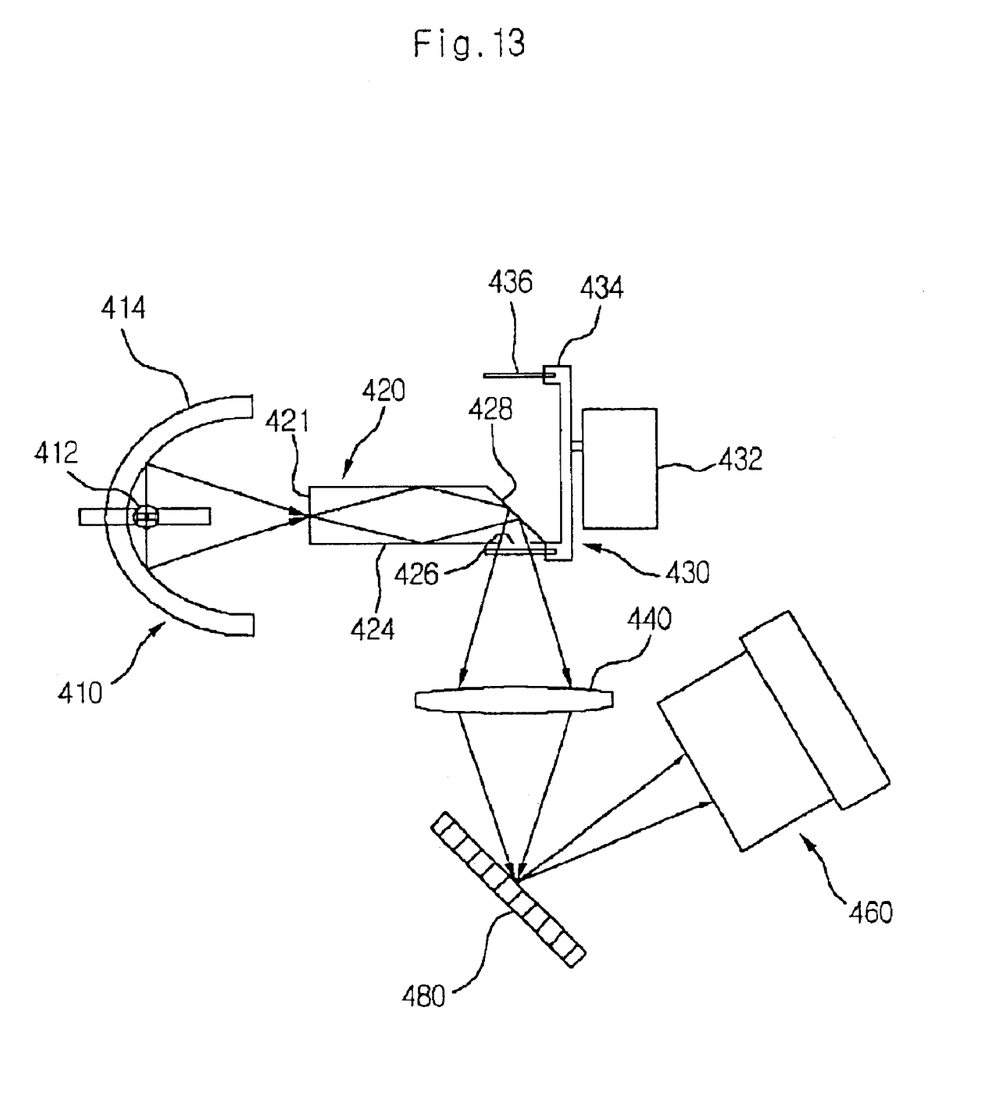
FIG. 13 is a schematic view of a projector using a color drum according to another preferred embodiment of the present invention.

FIG. 13 is a schematic view of a projector that includes a color drum according to another preferred embodiment of the present invention. As shown in FIG. 13, the projector according to another preferred embodiment of the present invention is a modified fashion of the projector shown in FIG. 7, in which the image display device is changed from the transmission type to the reflection type. Accordingly, the light converged by the converging lens 440 is expressed in colors by an image display device 480 and is reflected. The reflected light is then magnified and projected onto the projecting system 460. Since the lamp system 410, the road lens 420 and the color drum 436 have the same structure of those shown in FIG. 7, their detailed description will be omitted.

Thus, the projector according the present invention can be applied to all of the reflection type image display device and the transmission type image display device.

As described above, according to the display device of the present invention, there is provided a color drum on which cell filters are arranged to face the output surface in a curved surface shape. In addition, the cell filters are arranged cylindrically to surround the road lens. The cell filters of the color drum are formed in a linear shape.

Thus, since the cell filters are arranged in a curved surface shape, the loss of the light reflected by the color drum to the outside is prevented to the maximum extent to improve the light efficiency. Accordingly, the light brightness is enhanced further.

In addition, the linear scroll is possible due to the existence of the cell filters that are linear-shaped, so that separate linear scroll illumination is not required and the signal process can be simplified.

Furthermore, the road lens can be installed in the cylindrical color drum to reduce the overall size of the device, which enables the device to meet the current trend of the thin characteristic.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical system comprising:
   a road lens for reflecting light inputted from an outside, changing a path of the light and outputting the light;
   a color drum having a plurality of cell filters along a circumference thereof to face the path of the light so that the light outputted from the road lens is transmitted selectively; and
   a converging lens for converging the light transmitted through the color drum, wherein the road lens includes,
      an input surface having an opening for transmitting the light inputted from the outside and a reflection region,
      side portions for reflecting the light inputted through the input surface, and
      an output surface for outputting the inputted light and the reflected light from one of the side portions, wherein the road lens comprises a reflecting surface slanted by a predetermined angle from the output surface to turn the path of the light inputted through the input surface, and wherein the road lens is positioned so that the light outputted from the road lens is transmitted from inside the color drum to outside the color drum.

2. The optical system according to claim 1, wherein the reflecting surface is coated with a total reflection material or has a total reflecting mirror attached thereon.

3. The optical system according to claim 1, wherein the output surface comprises an opening having a size of including at least the plurality of cell filters of the color drum.

4. The optical system according to claim 1, wherein the plurality of cell filters of the color drum have surfaces arranged to face the output surface in the form of a concave curved surface.

5. The optical system according to claim 1, wherein the plurality of cell filters of the color drum are arranged in a linear shape.

6. The optical system according to claim 1, wherein the input surface is formed at a predetermined region of a side portion.

7. The optical system according to claim 6, wherein the output surface comprises an opening having a size of including at least the plurality of cell filters of the color drum.

8. The optical system according to claim 1, wherein the road lens has opposing end portions with the side portions extending therebetween, and wherein a reflecting device is within the road lens except for an input hole in the input surface and the output surface.

9. The optical system according to claim 1, wherein the road lens is inside the color drum.

10. A display device of magnifying and projecting a small-sized image to display a large-sized image, the device comprising:
    a lamp system for generating light and converging the light;
    an optical system including:
       a road lens for uniformly outputting the light converged by the lamp system, a color drum having a plurality of cell filters arranged orderly along a circumference thereof to face the path of the light outputted from the road lens, and a converging lens for converging the light transmitted through the color drum;

an image display device for expressing the light converged by the optical system in colors according to an applied electric signal; and a projecting system for magnifying and projecting the colors expressed by the image display device, wherein the road lens comprises:

an input surface to which the light generated by the lamp system is inputted, a side portion for reflecting the light inputted through the input surface, an output surface for projecting the light reflected by the side portion to the color drum, and a reflecting surface slanted by a predetermined angle from the output surfacer, for changing a path of the light inputted from the lamp system, and wherein a position of the road lens is located by an interior of the color drum, and wherein the light outputted from the output surface is directed from the interior of the color drum to an exterior of the color drum.

11. The display device according to claim 10, wherein the output surface comprises an opening sized to include at least the plurality of cell filters of the color drum.

12. The display device according to claim 10, wherein the plurality of cell filters of the color drum are arranged to face the output surface in the form of a concave curved surface.

13. The display device according to claim 11, wherein the cell filters of the color drum are arranged in a linear shape.

14. The display device according to claim 10, wherein input surface is formed at a predetermined region of one side portion of the road lens.

15. The display device according to claim 14, wherein the output surface comprises an opening sized to include at least the plurality of cell filters of the color drum.

16. The display device according to claim 10, wherein the image display device is one of transmission type and reflection type.

17. The display device according to claim 10, wherein the road lens is within the color drum.

18. A display device of magnifying and projecting a small-sized image to display a large-sized image, the device comprising:

a lamp system for generating light and converging the light;

a road lens for recovering and reflecting the light converged by the lamp system;

a color drum having a plurality of cell filters arranged along a circumference thereof to face the path of the light outputted from the road lens;

a converging lens for converging the light transmitted through the color drum;

an image display device for expressing the light converged from the optical system in colors according to an electric signal; and a projecting system for magnifying and projecting the colors expressed by the image display device, wherein the road lens further comprises:

a reflecting surface slanted by a predetermined angle from an input surface or an output surface of the road lens to change the path of the light, wherein the output surface of the road lens is within the interior of the color drums, and the light outputted from the road lens is transmitted through the color drum from an inner surface of the color drum to an outer surface.

19. The display device according to claim 18, wherein the road lens further comprises a side portion for totally reflecting the incident light.

20. The display device according to claim 18, wherein the plurality of cell filters of the color drum are arranged to face the output surface in the form of a concave curved surface.

21. The display device according to claim 18, wherein the plurality of cell filters of the color drum are arranged in a linear shape.

22. The display device according to claim 18, wherein the image display device is one of transmission type and reflection type.

23. The display device according to claim 18, wherein the road lens is inside the color drum.

24. An optical system comprising:

road lens means for reflecting light inputted from an outside, changing a path of the light and outputting the light, wherein the road lens means comprises reflecting surface means slanted by a prescribed angle from an input surface or an output surface of the road lens means to change the path of the light;

color drum means having a plurality of cell filters along a circumference, wherein the light outputted from the road lens means is transmitted from an inside of the color drum means to the outside of the color drum means; and converging lens means for converging the light transmitted through the color drum means.

* * * * *